United States Patent
Summerland

(10) Patent No.: US 10,790,762 B2
(45) Date of Patent: Sep. 29, 2020

(54) RELATING TO POWER ADAPTORS

(71) Applicant: LED LIGHTING CONSULTANTS LIMITED, Leicester (GB)

(72) Inventor: David Summerland, Leicester (GB)

(73) Assignee: ADP CORPORATE LIMITED (GB)

( * ) Notice: Subject to any disclaimer, the term of this patent is extended or adjusted under 35 U.S.C. 154(b) by 0 days.

(21) Appl. No.: 14/893,154

(22) PCT Filed: May 23, 2014

(86) PCT No.: PCT/GB2014/051602
§ 371 (c)(1),
(2) Date: Nov. 23, 2015

(87) PCT Pub. No.: WO2014/188219
PCT Pub. Date: Nov. 27, 2014

(65) Prior Publication Data
US 2016/0126860 A1    May 5, 2016

(30) Foreign Application Priority Data
May 23, 2013 (GB) .................................. 1309340.6

(51) Int. Cl.
*H05B 45/37* (2020.01)
*H05B 45/39* (2020.01)
(Continued)

(52) U.S. Cl.
CPC .............. *H02M 7/217* (2013.01); *H02M 1/08* (2013.01); *H02M 7/538* (2013.01); *H05B 45/10* (2020.01);
(Continued)

(58) Field of Classification Search
CPC ............ H05B 33/0845; H05B 33/0815; H05B 37/02; H05B 7/217; H05B 7/162;
(Continued)

(56) References Cited

U.S. PATENT DOCUMENTS

| 4,277,728 A | 7/1981 | Stevens |
| 4,415,839 A | 11/1983 | Lesea |

(Continued)

FOREIGN PATENT DOCUMENTS

| CN | 105594302 A | 5/2016 |
| DE | 100 11 077 A1 | 9/2001 |

(Continued)

OTHER PUBLICATIONS

Sharer, ETEE3212-Spring 2009 Course Schedule, Power Amplifier Circuits-Class B Operation; (https://coefs.uncc.edu/disharer/etee3212-activenetworksii/etee3212-lecture-notes/) (Year: 2009).*

(Continued)

*Primary Examiner* — Henry Luong
(74) *Attorney, Agent, or Firm* — Schmeiser, Olsen & Watts, LLP

(57) ABSTRACT

A power adaptor is disclosed, which comprises an input for connection to an AC power supply, a resonant circuit coupled to the input that provides an output suitable for driving a load, at least one half-bridge drive circuit for providing a drive signal to the resonant circuit, and a switch controller for the half-bridge drive circuit. The switch controller is adapted to provide one or more of the following, in at least one mode: (i) to provide the high-side switch and the low-side switch with on-times of different durations, (ii) to provide the high-side switch and the low-side switch with on-times that overlap, and (iii) to provide the high-side switch and the low-side switch with on-times that are synchronous. This may be utilised to control the current delivered to the output without any need to change the frequency at which the resonant circuit is driven.

24 Claims, 10 Drawing Sheets

(51) Int. Cl.

| | | |
|---|---|---|
| *H02M 7/538* | (2007.01) | |
| *H02M 7/217* | (2006.01) | |
| *H02M 1/08* | (2006.01) | |
| *H05B 45/10* | (2020.01) | |
| *H05B 47/10* | (2020.01) | |
| *H02M 7/48* | (2007.01) | |
| *H02M 7/155* | (2006.01) | |

(52) U.S. Cl.
CPC ............ *H05B 45/37* (2020.01); *H05B 47/10* (2020.01); *H02M 7/155* (2013.01); *H02M 2007/4815* (2013.01); *Y02B 20/348* (2013.01); *Y02B 70/1441* (2013.01)

(58) Field of Classification Search
CPC ...... H05B 7/1623; H05B 7/219; H05B 45/10; H05B 45/37; H05B 47/10; H02M 1/08; H02M 7/155; H02M 7/217; H02M 7/538; H02M 2007/4815; Y02B 20/348; Y02B 70/1441
See application file for complete search history.

(56) References Cited

U.S. PATENT DOCUMENTS

| | | | |
|---|---|---|---|
| 4,443,842 A | 4/1984 | Jessee | |
| 4,544,863 A | 10/1985 | Hashimoto | |
| 5,121,287 A | 6/1992 | Lee | |
| 5,381,076 A | 1/1995 | Nerone | |
| 5,426,350 A | 6/1995 | Lai | |
| 5,430,356 A | 7/1995 | Ference et al. | |
| 5,463,286 A | 10/1995 | D'Aleo et al. | |
| 2,661,645 A | 8/1997 | Hochstein | |
| 5,661,645 A | 8/1997 | Hochstein | |
| 5,783,909 A | 7/1998 | Hochstein | |
| 6,011,362 A | 1/2000 | Moisin | |
| 6,028,776 A | 2/2000 | Ji et al. | |
| 6,078,147 A | 6/2000 | Arts et al. | |
| 6,093,983 A | 7/2000 | Singh | |
| 6,097,614 A | 8/2000 | Jain et al. | |
| 6,118,231 A | 9/2000 | Geiginer et al. | |
| 6,181,082 B1 | 1/2001 | Moisin | |
| 6,181,588 B1 | 1/2001 | Kates et al. | |
| 6,188,163 B1 | 2/2001 | Danov | |
| 6,300,727 B1 | 10/2001 | Bryde et al. | |
| 6,353,545 B1 | 3/2002 | Ueda | |
| 6,411,045 B1 | 6/2002 | Nerone | |
| 6,545,434 B2 | 4/2003 | Sembhi et al. | |
| 6,590,350 B1 | 7/2003 | Tyson | |
| 6,600,273 B2 | 7/2003 | Kim et al. | |
| 6,842,668 B2 | 1/2005 | Carson et al. | |
| 6,927,546 B2 | 8/2005 | Adamson et al. | |
| 6,933,686 B1 | 8/2005 | Bishel | |
| 6,954,038 B2 | 10/2005 | Ido et al. | |
| 7,038,399 B2 | 5/2006 | Lys et al. | |
| 7,110,269 B2 | 9/2006 | Cao et al. | |
| 7,119,494 B2 | 10/2006 | Hui et al. | |
| 7,312,695 B2 | 12/2007 | Lehmer et al. | |
| 7,339,287 B2 | 3/2008 | Jepsen et al. | |
| 7,646,029 B2 | 1/2010 | Mueller et al. | |
| 7,786,676 B2 | 8/2010 | Cheng et al. | |
| 7,956,550 B2 * | 6/2011 | Nerone .............. | H05B 41/2827 315/224 |
| 7,965,527 B2 * | 6/2011 | Faccin ................ | H02H 7/1227 323/907 |
| 8,242,711 B2 | 8/2012 | Summerland et al. | |
| 2001/0022501 A1 | 9/2001 | Pilz et al. | |
| 2002/0191426 A1 | 2/2002 | Hussein et al. | |
| 2004/0085030 A1 | 5/2004 | Laflamme | |
| 2004/0228153 A1* | 11/2004 | Cao ..................... | H02M 3/3376 363/71 |
| 2004/0264187 A1 | 12/2004 | Vanderschuit | |
| 2005/0231133 A1 | 10/2005 | Lys | |
| 2005/0253533 A1 | 11/2005 | Lys et al. | |
| 2006/0002110 A1 | 1/2006 | Dowling et al. | |
| 2006/0022214 A1 | 2/2006 | Morgan et al. | |
| 2006/0192502 A1 | 8/2006 | Brown | |
| 2006/0238136 A1 | 10/2006 | Johnson, III et al. | |
| 2007/0080652 A1 | 4/2007 | Elferich et al. | |
| 2007/0108916 A1 | 5/2007 | Wang | |
| 2007/0126373 A1* | 6/2007 | Yu ...................... | H05B 41/2824 315/291 |
| 2007/0145907 A1 | 6/2007 | Hwang | |
| 2007/0152604 A1 | 7/2007 | Tatsumi | |
| 2007/0182347 A1 | 8/2007 | Shteynberg et al. | |
| 2007/0236159 A1 | 10/2007 | Beland | |
| 2008/0143271 A1 | 6/2008 | Takahashi et al. | |
| 2008/0224629 A1 | 9/2008 | Melanson | |
| 2009/0066262 A1 | 3/2009 | Tateishi | |
| 2009/0295300 A1* | 12/2009 | King .................. | H05B 33/0815 315/209 R |
| 2009/0322300 A1* | 12/2009 | Melanson ........... | H02M 3/1563 323/284 |
| 2010/0141169 A1 | 6/2010 | Summerland | |
| 2011/0254461 A1 | 10/2011 | Summerland | |
| 2012/0230073 A1* | 9/2012 | Newman, Jr. ...... | H05B 33/0815 363/126 |
| 2012/0249003 A1* | 10/2012 | Esaki .................. | H05B 33/086 315/201 |
| 2013/0057168 A1 | 3/2013 | Summerland | |
| 2013/0082675 A1* | 4/2013 | Capodivacca ......... | H05B 45/39 323/283 |
| 2013/0154492 A1 | 6/2013 | Summerland | |
| 2014/0117878 A1* | 5/2014 | Prodic ................ | H05B 33/0815 315/307 |
| 2014/0153294 A1* | 6/2014 | Deboy .............. | H02M 3/33569 363/21.04 |
| 2014/0265935 A1* | 9/2014 | Sadwick ............ | H05B 33/0815 315/307 |

FOREIGN PATENT DOCUMENTS

| | | |
|---|---|---|
| DE | 20 2004 002305 U1 | 4/2004 |
| EP | 0567280 A2 | 10/1993 |
| EP | 0574993 A1 | 12/1993 |
| EP | 0889673 A2 | 1/1999 |
| EP | 1093212 A1 | 4/2001 |
| EP | 1250030 A2 | 10/2002 |
| EP | 1528785 A1 | 5/2005 |
| EP | 1564618 A1 | 8/2005 |
| EP | 2079278 A2 | 7/2009 |
| EP | 2257124 A1 | 12/2010 |
| GB | 2 128 043 A | 4/1984 |
| GB | 2184566 A | 6/1987 |
| GB | 2449616 B8 | 7/2009 |
| JP | S6194568 | 5/1983 |
| JP | 03233895 | 10/1991 |
| JP | 408265124 | 11/1996 |
| JP | 03 265464 A | 11/1998 |
| JP | 3196157 A | 4/1999 |
| JP | 11231838 A | 8/1999 |
| JP | 2001-313424 | 9/2001 |
| JP | 2002137659 | 5/2002 |
| JP | 2002272127 A | 9/2002 |
| JP | 2003-157986 | 5/2003 |
| JP | 2003-317989 | 11/2003 |
| JP | 2004273267 A | 9/2004 |
| JP | 2005-011739 | 1/2005 |
| JP | 2007-80771 A | 3/2007 |
| JP | 2007035403 A | 3/2007 |
| JP | 2007227155 A | 9/2007 |
| JP | 09 163757 A | 7/2009 |
| JP | 2001272127 A | 10/2011 |
| KR | 10-2006-0115874 A | 11/2006 |
| WO | 9914990 | 3/1999 |
| WO | 1999/045750 A1 | 9/1999 |
| WO | 2003/079738 A1 | 9/2000 |
| WO | 2001/082657 A1 | 11/2001 |
| WO | 02/062106 A1 | 8/2002 |
| WO | 02/091805 A1 | 11/2002 |
| WO | 2003/096761 A1 | 11/2003 |
| WO | 2005/115058 A1 | 2/2005 |

(56) References Cited

FOREIGN PATENT DOCUMENTS

| WO | 2005/048658 | 5/2005 |
|---|---|---|
| WO | 2005/048658 A1 | 5/2005 |
| WO | 2006/038157 A2 | 4/2006 |
| WO | 2006/060900 A1 | 6/2006 |
| WO | 2006/102355 A2 | 9/2006 |
| WO | 2006/120629 A2 | 11/2006 |
| WO | 2007026170 A2 | 3/2007 |
| WO | 2008/056435 A1 | 5/2008 |
| WO | 2008110978 A1 | 9/2008 |
| WO | 2008/120019 A1 | 10/2008 |
| WO | 2006/018604 A1 | 2/2009 |
| WO | 2010/011971 A1 | 1/2010 |
| WO | 2011/083336 A2 | 7/2011 |
| WO | WO2012010900 A2 | 1/2012 |

OTHER PUBLICATIONS

56W Off-line, 120 VAC with PFC, 160V, 350mA Load, Dimmer Switch Compatible LED Drive. Internet Citation Feb. 1, 2009; pp. 1-19 XP 009150405 Retrieved from the Internet UR: http:/www.supertex.com/pdf/app_notes/DH-H05.pdf.
Borage et al., Analysis and design of an LCL-T resonant converter as a constant-current power supply, Industrial Electronics, IEEE Transactions on, vol. 52 No. 6 pp. 1547--1554, Dec. 2005.
Flower and Pollock 1997 Series Properties and design of series-paraellel load-resonant converters: their potential in marine and marine-related applications. Transactions on Image Processing, 110(2): 95-118.
Pollock et al (1997) Load resonant converter with zero current swtiching and variable output pwoer Electomic Letters 33(25): 2081-2082.
Pollock (1999) "Constant frequency, constant current load—resonant capacitor charging power supply." IEEE Proceedings Electric Power Applications, 146(2) : 187-192.
Pollock and Flower (1996) Series-parallel load-resonant converter for controlled-current arc welding power supply. IEE Proceedings—Electric power applications (143(3) 211-218.
Pollock and Flower (1997) New Method of Power control for Sereis-Parallel Load Resonant Converters Maininging Zero-Current Switching and Unity Power Factor Operation. IEEE Transactions on Power Electronics 12(1) 103-115.
Pollock and Miti (1995) Isolated Step up/down three-phase AC to DC power supply. Electronic letters 31(18) 1527-1529.
International Search Report & Written Opinion; PCT/GB2014/051602; International Filing Date: May 23, 2014; 13 pgs.
International Preliminary Report on Patentability for PCT/GB2014/051602, dated Nov. 24, 2015.

\* cited by examiner

RELATING TO POWER ADAPTORS

CROSS-REFERENCE TO RELATED APPLICATIONS

This application claims priority to PCT Application No. PCT/GB2014/051602, having a filing date of May 23, 2014, based on GB 1309340.6 having a filing date of May 23, 2013, the entire contents of which are hereby incorporated by reference.

FIELD OF TECHNOLOGY

This following relates to power adaptors, and particularly to power adaptors for solid state light sources.

BACKGROUND

LEDs are light sources that are being developed to replace conventional lighting systems, such as fluorescent and incandescent lights, in order to provide more energy efficient systems. Since an incandescent light source typically consumes 60-100 W and has a short lifetime, an LED bulb would be the excellent substitute with considerably less power dissipation and longer life. There has therefore been much research into the development of an LED bulb compatible with TRIAC dimmers, which are common in lighting systems.

A major issue with TRIAC dimmable LED bulbs is dimmer compatibility. The conventional TRIAC dimmer was designed to handle hundreds of watts induced by incandescent bulbs. An LED bulb consuming much less power will interact with those dimmers composed of high-power devices. If the interaction between dimmer and LED bulb is not stabilized, visible flicker is perceptible.

In order to prevent visible flicker, a conventional TRIAC dimmer needs a latching current at firing and a holding current during the TRIAC turn-on after firing. If those two currents are not met, the TRIAC dimmer misfires and the LED light source flickers.

The latching and holding currents are different between different dimmer models. The typical range of latching and holding currents is around 5~50 mA. Those operating requirements do not cause problems when incandescent bulbs are used, due to their high power consumption. However, an LED bulb with much less output power cannot maintain this amount of current over the whole line cycle without additional circuitry.

Another issue is the large current spike generated upon firing of a conventional TRIAC dimmer, which is commonly called current inrush. Such a current spike is generated as a result of the rapid charging of the capacitors of the power adaptor, and has the disadvantage of causing oscillations in the line current. As discussed above, a TRIAC dimmer requires a latching current during firing and a holding current after firing, and if these current levels are not met then the dimmer may misfire, resulting in flickering of the solid state light source. Therefore, such oscillations in line current may result in the required current levels not being met and the dimmer misfiring, or may even result in damage being caused to the TRIAC dimmer.

There has now been devised an improved power adaptor which overcomes or substantially mitigates the above-mentioned and/or other disadvantages associated with the prior art.

SUMMARY

An aspect relates to a power adaptor comprising an input for connection to an AC power supply, a resonant circuit coupled to the input that provides an output suitable for driving a load, at least one half-bridge drive circuit for providing a drive signal to the resonant circuit, and a switch controller for the half-bridge drive circuit, the half-bridge drive circuit having a high-side switch and a low-side switch, and the switch controller being adapted to provide one or more of the following, in at least one mode:

(i) to provide the high-side switch and the low-side switch with on-times of different durations,
(ii) to provide the high-side switch and the low-side switch with on-times that overlap, and
(iii) to provide the high-side switch and the low-side switch with on-times that are synchronous.

Embodiments of the present invention are advantageous principally because the switch controller providing the high-side switch and the low-side switch with on-times of different durations, on-times that overlap, and/or on-times that are synchronous, may be utilized to control the current delivered to the output without any need to change the frequency at which the resonant circuit is driven. This enables the current at the output to be controlled without changing the frequency at which the resonant circuit is driven, and therefore without any change to the resonant circuit itself.

The high-side switch and the low-side switch having on-times of different durations may be utilized to control the current drawn from the input. In particular, the high-side switch and the low-side switch may have on-times of different durations, i.e., asymmetric on-times, such that the degree of asymmetry between the high-side switch and the low-side switch determines the current drawn from the input. It has been found that the greater the degree of asymmetry between the on-times of the high-side switch and the low-side switch, the less current drawn from the input.

The current drawn at the input may be substantially equal to the current provided at the output, for example if there is no overlap between the on-times of the high- and low-side switches. This enables dimming control effected by the switch controller, without the need to change the frequency at which the resonant circuit is driven, and therefore without any need to change the resonant circuit itself. In particular, in order to reduce the current drawn from the input and the current provided at the output, the on-times of the high-side switch and the low-side switch may be varied relative to each other, for example such that the on-time of the high-side switch is shorter than the on-time of the low-side switch.

The high-side switch and the low-side switch having on-times of different durations, i.e., asymmetric on-times, may be utilized to determine the waveform of the current drawn at the input, e.g., to provide dimmer compatibility and/or reduce harmonic distortion. In particular, this may be achieved by the switch controller providing the high-side switch and the low-side switch with on-times of different durations, i.e., asymmetric on-times, and varying the degree of asymmetry between the high-side switch and the low-side switch during each input cycle to determine the waveform of the current drawn from the input.

An overlap between the on-times of the switches may be utilized to create a load condition in the period of overlap, in each input cycle, which may increase the current drawn at the input relative to the current delivered to the output in the period of overlap, in each input cycle. This enables the current at the output to be reduced without reducing the current drawn at the input, for example. In addition, it enables a latch current for a dimmer switch to be drawn in each input cycle, in the period of overlap, and a lower hold current to be drawn subsequently, in each input cycle, without any need to change the frequency at which the resonant circuit is driven. Since the latch current for a conventional dimmer switch in a mains supply (e.g., 85 mA) typically only needs to be drawn for a few hundred μs, relative to the hold current (e.g., 50 mA) that is typically drawn for a few ms, the additional current (35 mA) that is not provided to the output would result in acceptably small losses, e.g., 100-200 mW on 230V mains supply. This control may also help reduce the voltage reduction problems seen just after the TRIAC of a conventional dimmer switch fires, and may therefore negate the need for snubber circuits and their associated losses.

The power adaptor may also have a mode in which no power is provided at the output, but the power adaptor provides a load condition to the input, by the switch controller providing the high-side switch and the low-side switch with simultaneous on-times.

The greater the duration of the overlap for the on-times or the duration of the simultaneous on-times, the lower the resistance or dynamic impedance of the load provided. This is particularly advantageous for solid state light sources, e.g., LEDs. In particular, this load condition may provide a DC path, which prevents false start-up conditions. This enables use with dimmers, and also prevents glowing occurring from a pickup supply.

The switch controller may utilize any combination of the above configurations of on-times to provide the desired current draw at the input and the required current at the output.

Where the power adaptor has a mode in which a load condition is generated by overlapping or synchronous on-times of the switches, the controller may be adapted to determine whether the impedance of the load condition will be acceptable for the voltage of the power supply. The controller is preferably, therefore, adapted to monitor the voltage of the power supply.

The power adaptor may be adapted to switch between two or more modes, which each provide a different configuration of on-times for the high-side switch and the low-side switch. Since embodiments of the present invention enable different modes without changing the frequency at which the resonant circuit is driven, the resonant circuit is preferably driven at, or approximately at, its resonant frequency or a sub-harmonic thereof in each mode.

The power adaptor may be adapted to monitor the input voltage, and alter the ratio between the current provided at the output and the resistance across the input, based on that input voltage. In particular, this ratio may be altered proportionally based on the input voltage, such that sudden changes in current and/or input resistance are not created when switching modes. Where the power adaptor is adapted for use with a mains supply and solid state light sources, these sudden changes in current and/or input resistance may cause ringing or harmonics on the mains, possible flicker on the output, and may result in dimmer incompatibility. The ratio may be altered by changing the amount of overlap of the on-times of the high- and low-side switches.

The high- and low-side switches are preferably bipolar junction transistors (BJTs), which are typically less expensive than field-effect transistors (FETs). Furthermore, since BJTs have limited gain, there is a reduced risk of damage to the switches from current inrush relative to FETs, which have infinite gain and require damping circuits.

For some applications, for example power adaptors for driving solid state light sources, e.g., LEDs, that are compatible with conventional dimmer switches (e.g., TRICS and SCR switches), it is preferable for the power adaptor to maintain a substantially constant current input for varying input voltages.

The resonant circuit may therefore be an LCL series-parallel resonant circuit. The LCL series-parallel resonant circuit comprises a first inductor L1 and a first capacitor C1 in series, and a parallel load leg including a second inductor L2. The first inductor L1 and first capacitor C1 are connected in series between two input terminals of the resonant circuit, and the load leg is connected in parallel across the first capacitor C1, wherein the load leg comprises the second inductor L2 and an output for driving the load, which are connected in series.

Power adaptors utilizing an LCL series-parallel resonant circuit are described in WO 2008/120019, WO 2010/041067, WO 2010/139992, WO 2011/083336 and WO 2012/010900, the teaching of each of which are incorporated herein by reference in their entirety.

The use of an LCL series-parallel resonant circuit provides a power adaptor suitable for solid state light sources, such as LEDs, that has a substantially constant current draw and high efficiency. In particular, the output current becomes independent of output voltage and if the power adaptor is powered by a low frequency sine voltage input, and the output voltage is constant, i.e., an LED load, the input current becomes a low frequency, substantially square wave ideal for drive by a TRIAC dimmer as it maintains the hold current at the lowest possible power whilst providing the LED with a current source that varies in brightness with the low frequency input voltage, i.e., it makes the LED act like a lamp bulb and enables control by a TRIAC dimmer at vastly reduced power and high power factor relative to other power adaptor technology.

The load may therefore be one or more LEDs, and the input may be drawn from a TRIAC or SCR dimmer.

It has also been found that the second inductor of the LCL series-parallel resonant circuit may be reduced significantly, or even removed, where a high voltage LED(s) are used. Hence, the resonant circuit may be an LC resonant circuit that provides an output suitable for driving a solid state light source, the LC resonant circuit being driven at a frequency, and optionally with a dead band, that causes the LC resonant circuit to draw a substantially constant current from the AC power supply. By "substantially constant current" with respect to an AC power supply is meant a substantially square-wave current draw.

It has been found that the LC resonant circuit may be driven to provide the same properties of the LCL series-parallel resonant circuit discussed above, but only where the LED has a voltage comparable, e.g., at least +/−50%, or preferably +/−25%, to the rms voltage of the AC power supply.

It may be desirable to provide a low mains current total harmonic distortion ($I_{THD}$), e.g., less than 15%, for certain markets and/or lamp types. In these embodiments, rather than a substantially constant current draw from the mains supply, the power adaptor may be adapted to draw a substantially sinusoidal current waveform from the mains supply. This may be achieved by the switch controller providing the high-side switch and the low-side switch with on-times of different durations, i.e., asymmetric on-times, and varying the degree of asymmetry between the high-side switch and the low-side switch during each input cycle to determine the waveform of the current drawn from the input. In particular, it has been found that the greater the degree of asymmetry between the on-times of the high-side switch and the low-side switch, the less current drawn from the input. In addition, where the resonant circuit includes DC link capacitors that are charged on the rising half of the mains supply input cycle, more current would be drawn on the rising edge of the mains supply input cycle. As such, it may be necessary to delay the power increase on the rising side of the half cycle to compensate for this, whereas on the falling side of the mains voltage, the power may decrease as the voltage decreases.

In presently preferred embodiments, the high-side switch and the low side switch of the half-bridge drive circuit are arranged with their respective emitter or source terminals connected at the centre of the half bridge.

Since, in this embodiment, the switching voltage applied to the base or gate terminal of a transistor is referenced relative to the voltage at the emitter or source terminal, this enables a common reference in the form of a floating ground. This removes any need for a level shifter circuit, which is a high voltage circuit that is typically expensive and results in power loss, and hence reduced efficiency. Embodiments of the invention therefore reduce cost and increases efficiency relative to the prior art. In addition, embodiments of the invention enable the drive circuitry to be at low voltage, and enables the same drive circuitry to drive both the high- and low-side switches. Indeed, according to a further embodiments of the invention, there is provided a half-bridge drive circuit comprising a high-side switch and a low side switch, each having an emitter or source terminal, wherein the high-side switch and the low side switch are arranged with their respective emitter or source terminals connected at the centre of the half bridge.

The high-side switch is preferably an NPN bipolar junction transistor (BJT), or a similarly functioning transistor. The low-side switch is preferably a PNP bipolar junction transistor (BJT), or a similarly functioning transistor. The transistors being bipolar junction transistors (BJTs) may enable the switch controller to be at low voltage, e.g., less than 5V, e.g., 2V. Where an integrated circuit is provided, a low voltage power supply may be formed by one or more diodes and an energy storage device such as a capacitor.

The switches are typically configured with a switching voltage at the base or gate terminal that is determined relative to the voltage at the emitter or source terminal. The connection between the emitter or source terminals of the high-side switch and the low side switch preferably therefore provides a common reference for the switching voltage of the high-side switch and the low-side switch in the form of a floating ground. The collector or drain terminals of the high-side switch and the low side switch may be connected to the positive supply voltage and normal ground, e.g., 0V, respectively, of the circuit.

The low-side switch preferably has a negative switching voltage at the base/gate of the switch that is determined relative to a common reference in the form of a floating ground. The negative switching voltage may be generated by a charge-pump, for example.

The switch controller preferably takes the form of an integrated circuit. The ground connection of the switch controller is preferably connected to the emitter or source terminals of the high-side switch and the low side switch, such that the ground connection of the switch controller has a reference common to the high-side switch and the low side switch in the form of a floating ground.

The switch controller is preferably provided with a local supply, or a bootstrap from the normal ground, or the capacitors that would typically be connected across the high- and low-side switches may be adapted to provide power to the switch controller, these may feed the charge pump diodes on the microprocessor.

This embodiment of the invention is particularly advantageous when used to drive an LCL series-parallel resonant circuit. This arrangement enables the half-bridge drive circuit to function without any feedback, e.g., from an inductor to an oscillator drive. This arrangement also removes the need for any feedback transformers, which are large and expensive. Embodiments of the present invention are also particularly advantageous to the LCL circuit as it allows the use of a low voltage process.

The switch controller may include a low voltage process integrated circuit, and the high-side switch and the low-side switch may be external of the integrated circuit. The switch controller may include a microprocessor, and the ESD diodes on the ports of the microprocessor are utilized as charge pump diodes in the provision of a power supply for the microprocessor.

The switch controller may be configured to also control an output stage, such as a rectifier circuit having multiple modes of operation, as described in WO 2011/083336 A2 and WO 2012/010900 A2. This is enabled by this embodiment of the invention because the switch controller is referenced to a centre point of the half-bridge drive circuit, i.e., the floating ground, which will have a similar, or the same, potential as the reference of the output stage.

Since the resonant circuit may draw the bulk of the overshoot current when in or near resonance, reverse parallel diodes across the drive transistor(s) may be absent. This is advantageous because the reverse parallel diodes need to be high voltage diodes. However, in order to minimise the effect of not having the reverse parallel diodes, diodes connected between a common point between the transistors and the base terminals of the transistors may be utilized to provide base extraction current for fast turn off.

The power adaptor according to embodiments of the invention is particularly advantageous in relation to the driving of solid state light sources from a mains supply including a conventional dimmer switch. In addition, however, the control discussed above may be used in other fields, for example in relation to motor control. In particular, embodiments of the present invention enable bi-directional motor control, for example, and driving DC and high frequency AC motors, for example.

International Patent Application WO2010/041067, the teaching of which is hereby incorporated by reference in its entirety, describes improvements in power adapters that are useful in driver circuits for LED solid state lighting systems. Such systems are referred as "RAIS" technology, and incorporate an LCL series-parallel resonant circuit comprising a first inductor L1 and a first capacitor C1 in series, and a parallel load leg including a second inductor L2. The first inductor L1 and first capacitor C1 are connected in series between two input terminals of the resonant circuit, and the load leg is connected in parallel across the first capacitor C1, wherein the load leg comprises the second inductor L2 and an output for driving the load, which are connected in series. The LCL circuit is connected to an output rectifier bridge (denoted 24 in FIG. 4 of WO2010/041067).

To prevent the flickering of dimmed solid state lighting systems, RAIS technology provides the ideal waveform for the type of dimmer that is in use. RAIS has two different modes of operation, depending on which type of dimmer is in use, and these two modes are referred to as "double hold" and "half power".

For leading edge, e.g., TRIAC, dimmers, the current for operation is drawn at full power for only the first 90° of the 180° mains power cycle; and this is the double hold application of RAIS. When a dimmer is switched on, the RAIS technology sends a resonant waveform to the output bridge, and this process lasts for the duration of the on time of the dimmer. However, the modified output bridge shorts out this signal for approximately the second half, or longer if different dimming curves are required, resulting in the current being drawn at the input for approximately one-half the time expected.

Trailing edge dimmers, however, draw current for operation at half power for the entire mains cycle; this is the half power mode of operation of RAIS. A rectifier circuit that enables this mode of operation to be implemented is described in International Patent Application WO2011/083336, the teaching of which is hereby incorporated by reference in its entirety.

Clearly, in order the appropriate mode of operation to be selected, there is a need to be able to identify which type of dimmer is in use. A known method of achieving this requires the input voltage waveform to be monitored. In particular, such a method requires a connection to VDC (rectified mains AC current). The input voltage waveform is monitored and if a fast edge is detected, it is determined that the dimmer in use is a TRIAC dimmer. This then prompts the RAIS technology to use the double hold mode of operation. If no fast edge is detected, the dimmer is determined to be trailing edge and the half power mode of operation is used.

It has now been found that it is possible to identify the type of dimmer, and hence the required mode of operation, without monitoring the input voltage waveform.

According to a further embodiment of the invention, there is provided a power adaptor comprising an input for connection to an AC power supply and a resonant circuit coupled to the input that provides an output suitable for driving a load, wherein the resonant circuit generates resonant waveform, the power adapter being adapted to monitor the resonant waveform so as to detect variations in the resonant waveform.

Variations in the resonant waveform may have the form of gaps, rapid changes or other variations. The waveform may be monitored by various means which will be evident to those skilled in the art, e.g., by coupling the signal at AC1 into a suitable processor, timing circuit or the like. The waveform may take the form of a train of pulses.

The presence or absence of variations in the resonant waveform may be indicative of the type of power reducing device to which the power adapter is connected. The presence of gaps, variations or rapid changes in the resonant waveform may be indicative of dimmer retriggering and the presence of a leading edge (e.g., TRIAC) dimmer. This then leads to activation of the double hold mode of operation.

Where no such variation in the resonant waveform is detected, the power adapter operates in the half power mode. To enable this, the power adapter may comprise a rectifier of the type described in WO2011/083336.

An advantage of embodiments of the invention is that it does not require connection to a monitor circuit, which may therefore be omitted. The VDC connection 3 of FIG. 1 is therefore not required in this embodiment of the invention, in which instead the resonant waveform is monitored at AC1 and/or AC2. The system is therefore much better suited to isolated circuits.

Embodiments of the invention are further advantageous in that gaps, variations or rapid changes in the resonant waveform can be detected within 1-3 mains half cycles. Thus, the double hold mode of operation is activated quickly, with the result that flickering of the solid state lighting system is imperceptible by the human eye.

Furthermore, in the case where one low power lamp is connected to a dimmer, if the dimmer becomes unstable and false triggers, the lamp draws power in the double hold manner as described above. In embodiments of the invention, as more lamps are added, the dimmer stabilises and draws its current across the full cycle providing a better power factor (PF) for the line. This will balance out the power factor of the single lamp systems that draw slightly lower power factor.

A power adaptor comprising an input for connection to an AC power supply and a resonant circuit coupled to the input that provides an output suitable for driving a load, wherein the resonant circuit has a first mode of operation, and a second mode of operation is provided in which at least one of the inductance and capacitive components of the resonant circuit is modified or removed.

The power adaptor according to embodiments of the invention is advantageous principally because the resonant circuit may be configured to supply power at two different levels, whilst optimising efficiency in both modes of operation.

The resonant circuit is preferably an LCL series-parallel resonant circuit. The LCL series-parallel resonant circuit comprises a first inductor L1 and a first capacitor C1 in series, and a parallel load leg including a second inductor L2. The first inductor L1 and first capacitor C1 are connected in series between two input terminals of the resonant circuit, and the load leg is connected in parallel across the first capacitor C1, wherein the load leg comprises the second inductor L2 and an output for driving the load, which are connected in series.

Power adaptors utilizing an LCL series-parallel resonant circuit are described in WO 2008/120019, WO 2010/041067, WO 2010/139992, WO 2011/083336 and WO 2012/010900, the teaching of each of which are incorporated herein by reference in their entirety.

The use of an LCL series-parallel resonant circuit provides a power adaptor suitable for solid state light sources, such as LEDs, that has a substantially constant current draw and high efficiency. In particular, the output current becomes independent of output voltage and if the power adaptor is powered by a low frequency sine voltage input, and the output voltage is constant, i.e., an LED load, the input current becomes a low frequency, substantially square wave ideal for drive by a TRIAC dimmer as it maintains the hold current at the lowest possible power whilst providing the LED with a current source that varies in brightness with the low frequency input voltage, i.e., it makes the LED act like a lamp bulb and enables control by a TRIAC dimmer at vastly reduced power and high power factor relative to other power adaptor technology.

The load is preferably, therefore, one or more LEDs, and the input may be drawn from a TRIAC dimmer.

The power adaptor may have a second mode of operation in which the capacitive component of the resonant circuit is reduced. This may be achieved using an electronic switch, e.g., a transistor or a thyristor, for removing a capacitor from the resonant circuit. For example, the capacitive component of the resonant circuit may be provided by at least two capacitors in parallel, with at least one of the capacitors being removable from the resonant circuit using the electronic switch. The electronic switch may be controlled by a controller, such as an integrated circuit. This second mode of operation may be utilized to provide lower power to the load, relative to the first mode of operation.

The first mode of operation may therefore be configured to provide a higher current draw, and hence a higher power draw, relative to the second mode of operation. The first mode of operation may therefore be used to draw the latch current of a TRIAC dimmer, and a dead band in the driving signal for the resonant circuit may then be introduced and/or varied to draw the (usually lower) hold current of the TRIAC dimmer. For stable, low power lamps, however, the second mode of operation may be utilized.

When entering the second mode of operation, the frequency of the drive signal for the resonant circuit will typically need to be varied, and/or any dead band will typically need to be varied, in order for the modified resonant circuit to function.

This second mode of operation allows for a much lower power for use by low power lamps, allowing the double hold principle to be used where the resonant circuit is used with mains supply, trailing edge and leading edge dimmers, where the lamp is stable. If instability is detected or it's preferred to switch modes on detection of the leading edge, the mode can be changed back to the first mode of operation, thereby drawing significantly higher power and the required hold current.

An alternative configuration comprises an LCL series-parallel resonant circuit with a capacitance across its output. This capacitance is described in WO 2011/083336 as being present to reduce conducted emissions when driving solid state light sources, such as LEDs. In this configuration, the power adaptor may have a second mode of operation in which the capacitive component of the LCL resonant circuit is removed. In this second mode of operation, the LCL resonant circuit changes to an LC resonant circuit comprised of the remaining inductors of the LCL resonant circuit in series with the capacitance across its output. It has been found that the LC resonant circuit may be driven to provide the same properties of the LCL series-parallel resonant circuit discussed above, but only where the LED has a voltage comparable, e.g., at least +/−50%, or preferably +/−25%, to the rms voltage of the AC power supply.

The following features are believed to be advantageous in relation to power adaptors comprising resonant circuits, and not just the two mode configuration described above. Hence, according to a further embodiment of the invention, there is provided a power adaptor comprising an input for connection to an AC power supply and a resonant circuit coupled to the input that provides an output suitable for driving a load, wherein the power adaptor includes one or more of the features set out below.

The power adaptor may introduce a dead band into the driving signal for the resonant circuit, for example to decrease the power to the LED(s), and still draw the same current. The dead band may therefore be used to allow a lower amount of power to the LED(s), where the overall power is increased to allow the latch current to be drawn, which is often higher than the hold current. This removes the need for RC bleeder circuits.

The resonant circuit may be driven by one or more drive transistors, and preferably two transistors—a high-side transistor and a low-side transistor. The transistors may be driven by any appropriate drive circuit, which would typically include an oscillator, but are preferably driven by a controller, such as an integrated circuit. The transistors may be bipolar junction transistors (BJTs), which feature enables the drive circuit to be at low voltage, e.g., less than 5V, e.g., 2V. Where an integrated circuit is provided, a low voltage power supply may be formed by one or more diodes and an energy storage device such as a capacitor.

The gain of the drive transistors may be utilized to provide fast start with high efficiency, with resistors feeding the base terminals of the drive transistors, which then charge an energy storage device such as a capacitor at a rate determined by the resistors and the gain of the drive transistors.

The pulse width of the high-side and low-side transistors may differ to account for different turn off times, e.g., between NPN and PNP transistors. For example, the pulse width of the high-side drive transistor may be wider than that of the low-side drive transistor to accommodate the greater base storage time of the low side PNP transistor.

Since the resonant circuit draws the bulk of the overshoot current when in or near resonance, reverse parallel diodes across the drive transistor(s) may be absent. This is advantageous because the reverse parallel diodes need to be high voltage diodes. However, in order to minimise the effect of not having the reverse parallel diodes, diodes connected between a common point between the transistors and the base terminals of the transistors may be utilized to provide base extraction current for fast turn off.

As discussed above, it has now been found that the second inductor of the LCL series-parallel resonant circuit may be reduced significantly, or even removed, where a high voltage LED(s) are used. Hence, according to a further embodiment of the invention, there is provided a power adaptor comprising an input for connection to an AC power supply and an LC resonant circuit coupled to the input that provides an output suitable for driving a solid state light source, the LC resonant circuit being driven at a frequency, and optionally with a dead band, that causes the LC resonant circuit to draw a substantially constant current from the AC power supply.

By "substantially constant current" with respect to an AC power supply is meant a substantially square-wave current draw.

It has been found that the LC resonant circuit may be driven to provide the same properties of the LCL series-parallel resonant circuit discussed above, but only where the LED has a voltage comparable, e.g., at least +/−50%, or preferably +/−25%, to the rms voltage of the AC power supply.

According to a further embodiment of the invention, there is provided a power adaptor for a solid state light source comprising an active damping circuit, wherein the active damping circuit has a resistive load in parallel with a constant current circuit.

The power adaptor according to this embodiment of the invention is advantageous principally because the active damping circuit damps the current spike or current inrush associated with the firing of a TRIAC in a TRIAC dimmer, whilst maintaining high efficiency by means of the constant current circuit when no current spike or current inrush is present. This is advantageous over prior art arrangements principally because there are two damping circuits active continuously, with no timing or delay between their activation, which combine to maintain high efficiency. Furthermore, prior art arrangements comprising a FET across a resistive load have been found to suffer from current ringing when the switch is activated—embodiments of the present invention solve this problem.

When a current spike or current inrush is present, the current may be limited by the resistive load plus the constant current from the constant current circuit. When no current spike or current inrush is present, the constant current circuit feeds the power adaptor. This aspect of the invention is particularly advantageous for power adaptors that draw a substantially constant current, for example utilize an LCL series-parallel resonant circuit or an LC resonant circuit, as discussed above. The constant current circuit is adapted to feed a resonant circuit of the power adaptor, e.g., the LCL resonant circuit, at a current greater than that needed by the resonant circuit, such that the voltage drop across the constant current circuit is minimised.

BRIEF DESCRIPTION

Some of the embodiments will be described in detail, with reference to the following figures, wherein like designations denote like members, wherein.

Figure 3A:
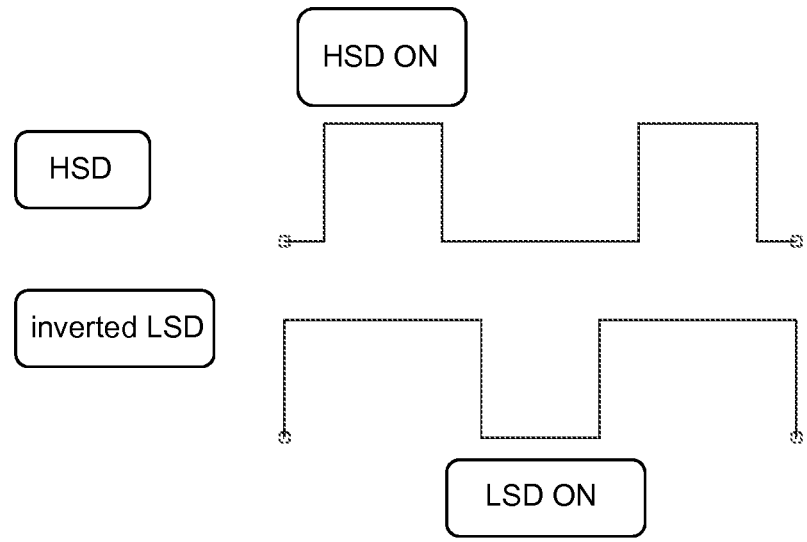
Figure 3B:
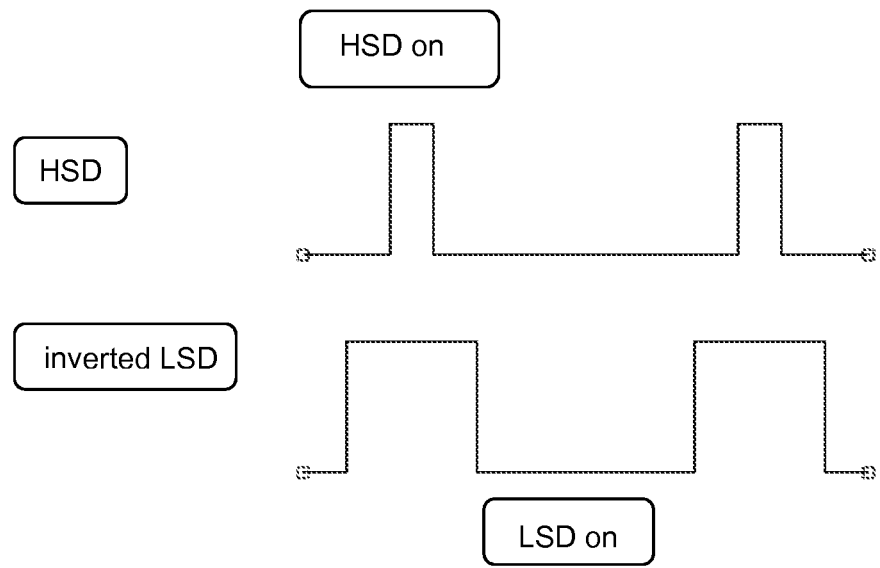
Figure 3C:
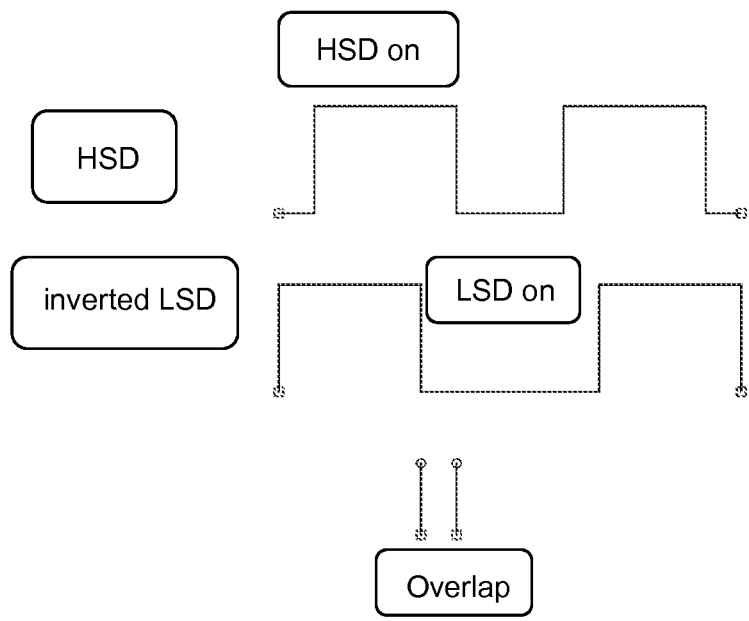
Figure 3D:
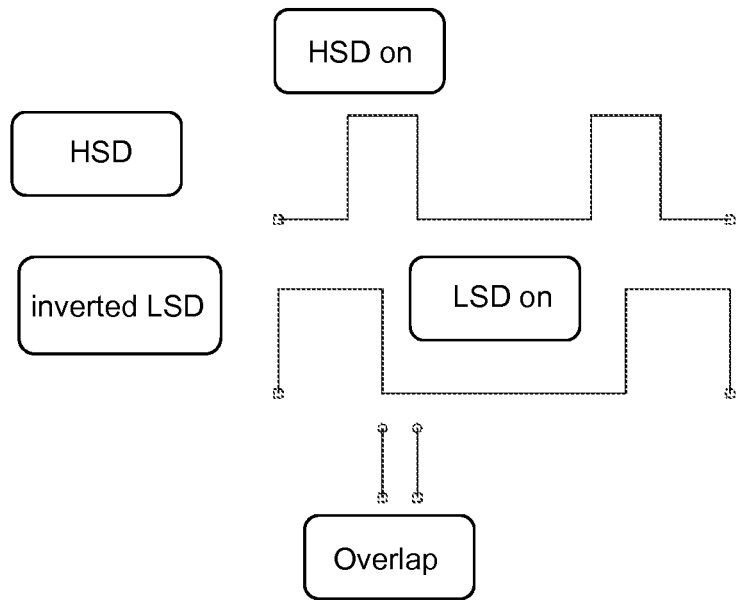
Figure 3E:
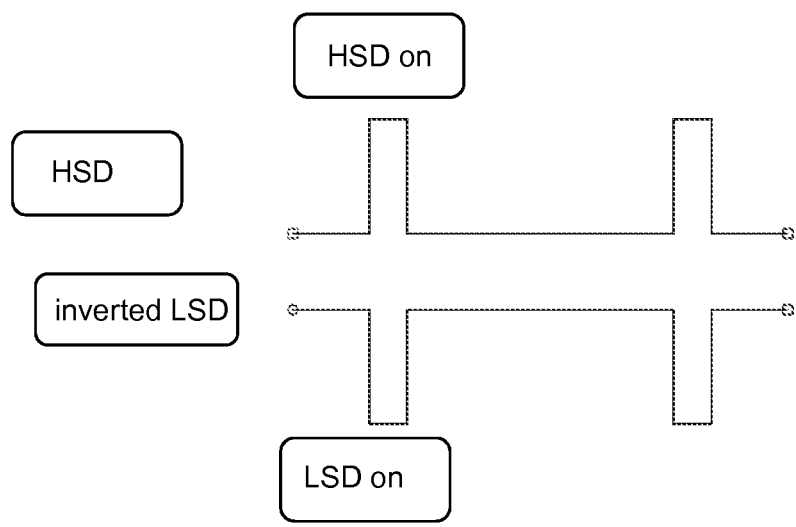
Figure 3F:
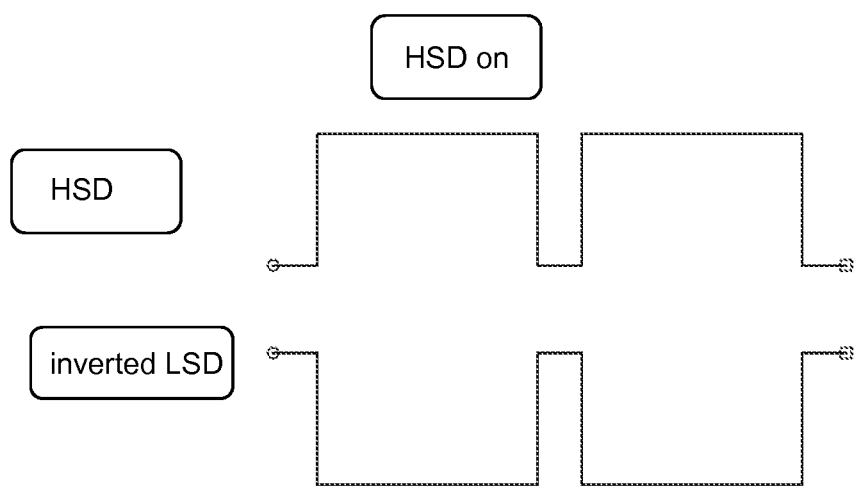
Figure 4:
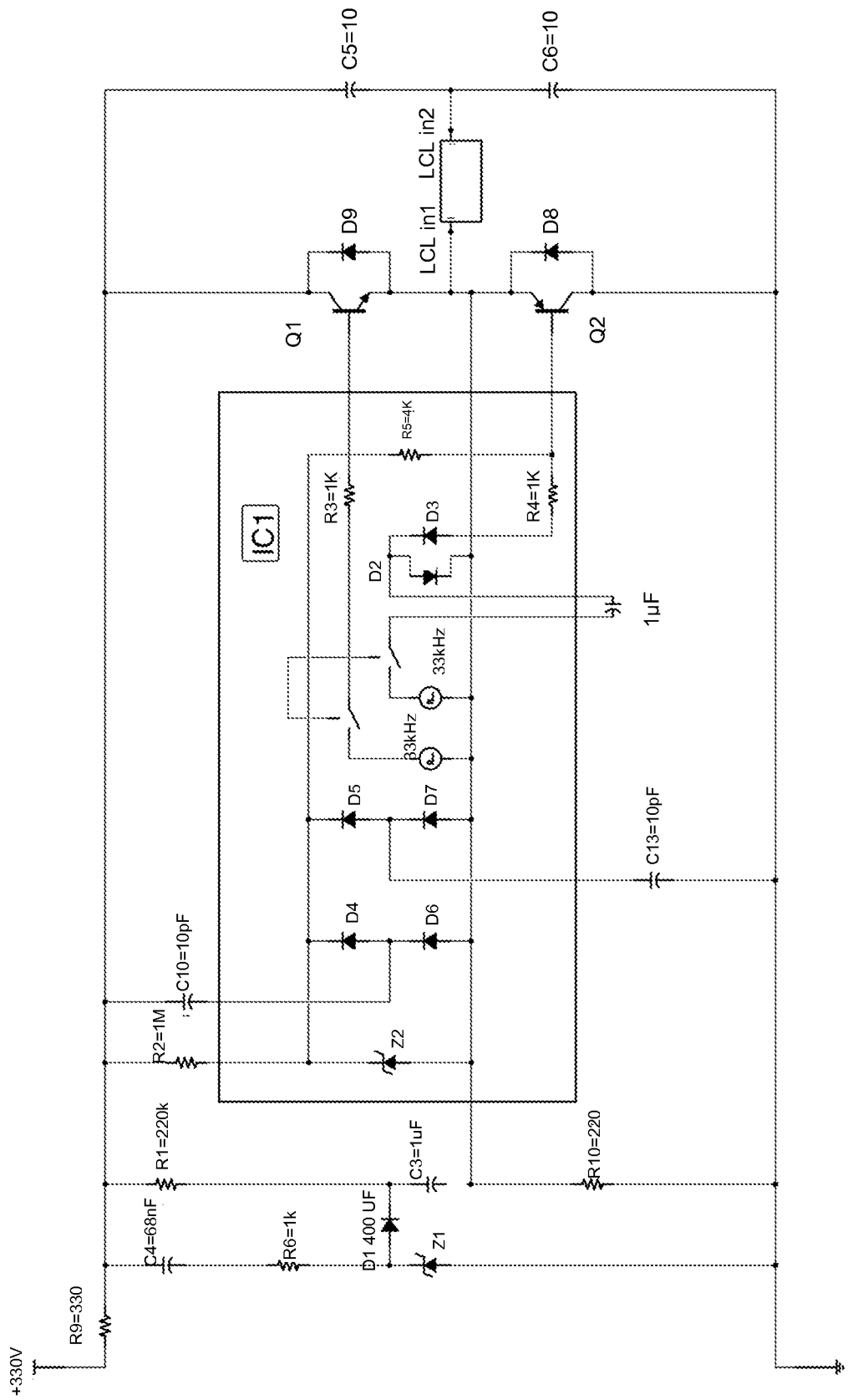
Figure 5:
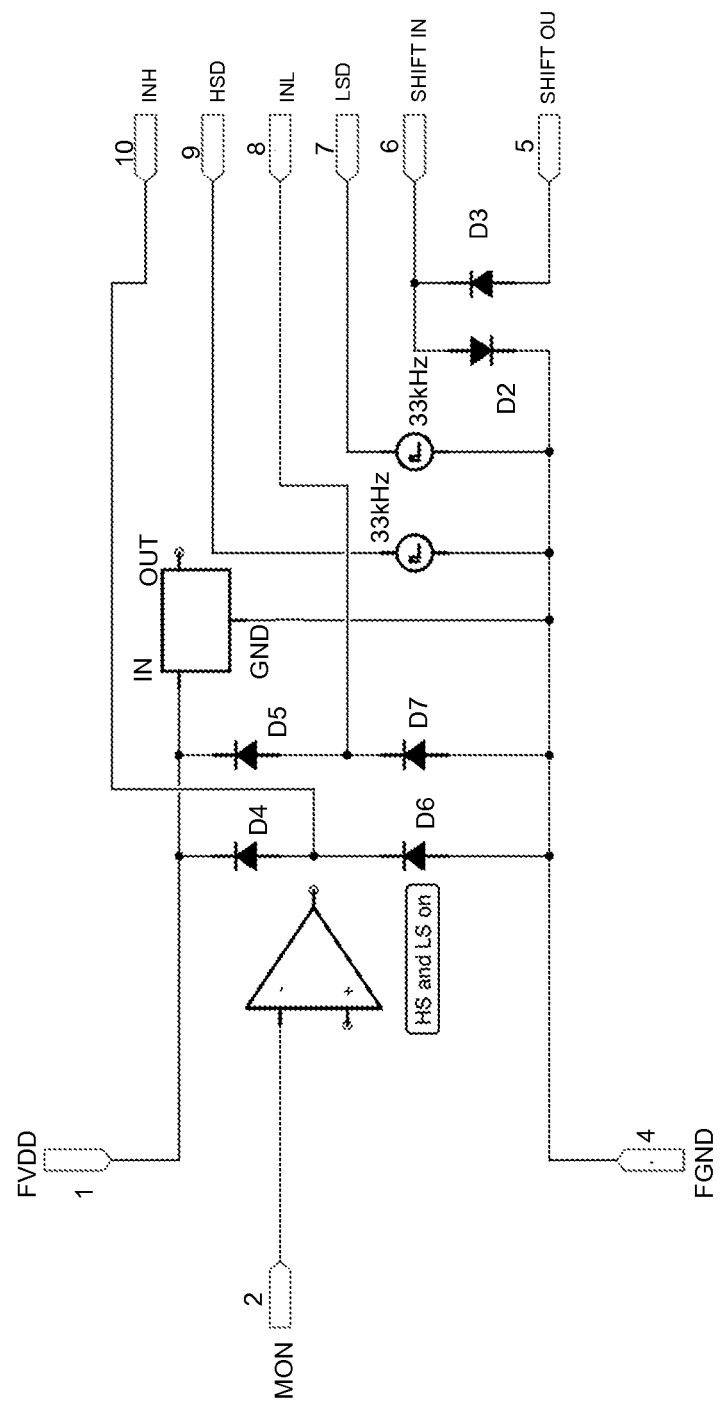
Figure 6:
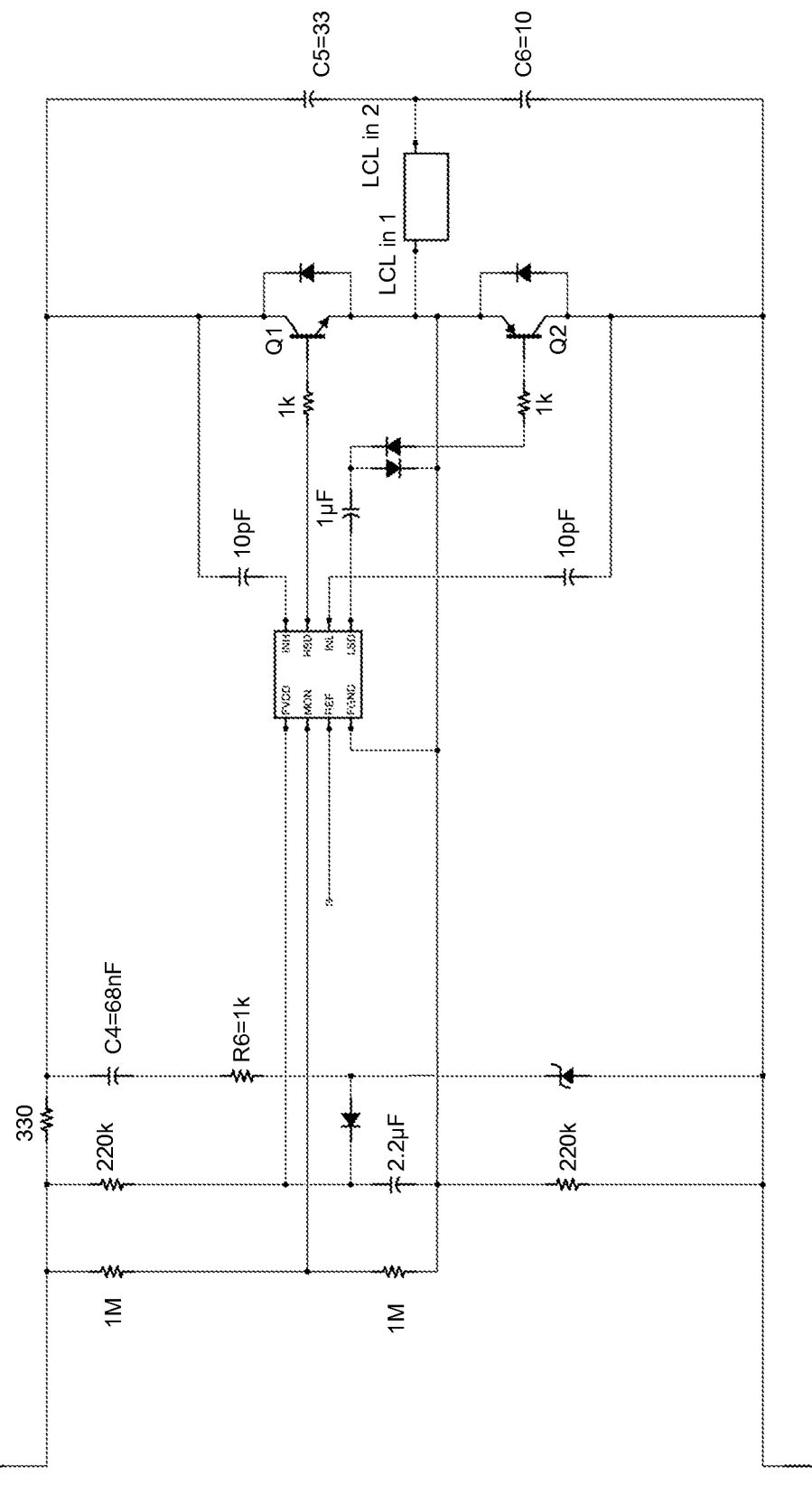
Figure 7:
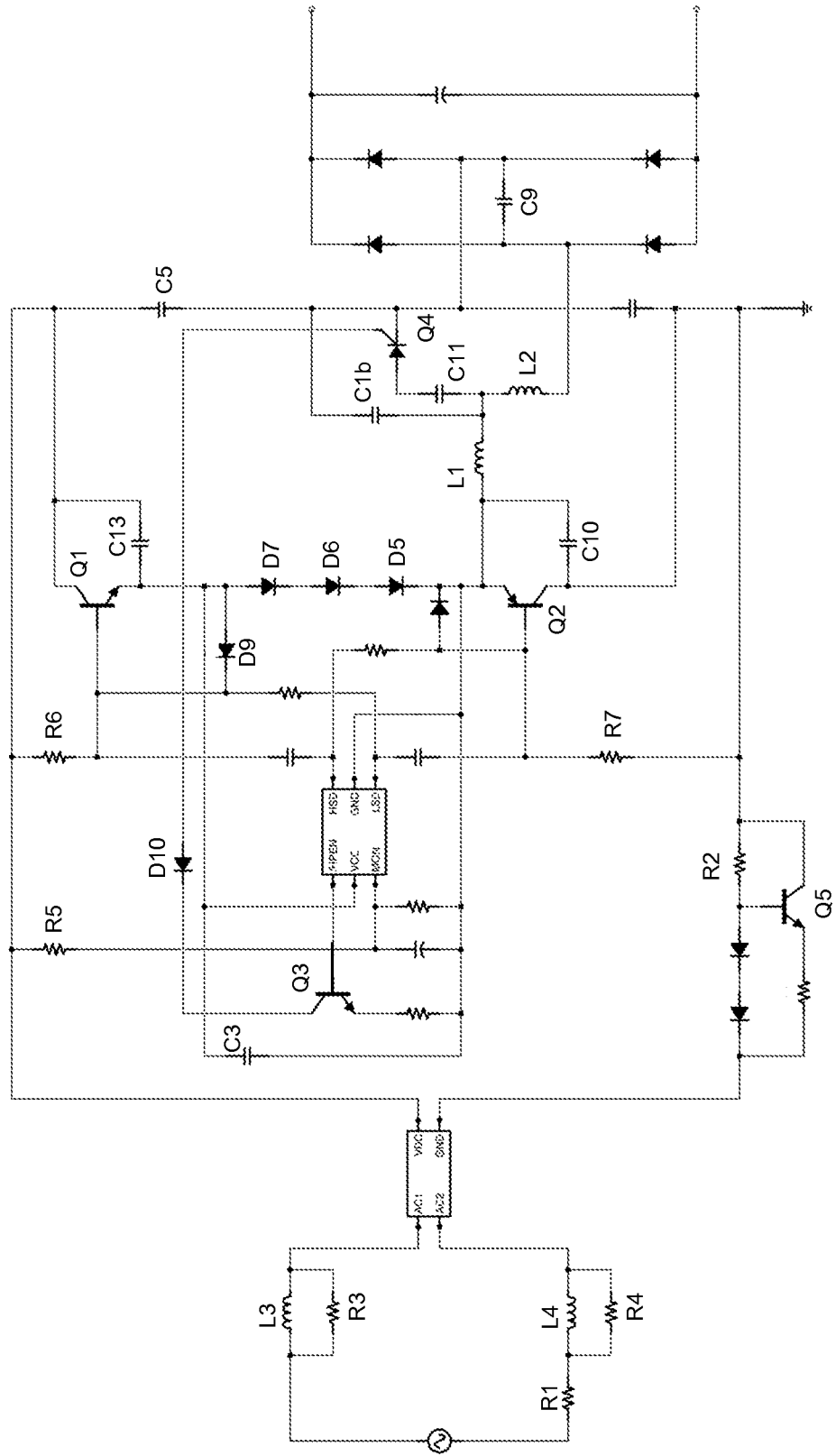

FIG. 3*a* shows an example of a waveform for the high-side switch and the low-side switch of the half-bridge drive circuit of an embodiment of the power adaptor;

FIG. 3*b* shows an example of a waveform for the high-side switch and the low-side switch of the half-bridge drive circuit of an embodiment of the power adaptor;

FIG. 3*c* shows an example of a waveform for the high-side switch and the low-side switch of the half-bridge drive circuit of an embodiment of the power adaptor;

FIG. 3*d* shows an example of a waveform for the high-side switch and the low-side switch of the half-bridge drive circuit of an embodiment of the power adaptor;

FIG. 3*e* shows an example of a waveform for the high-side switch and the low-side switch of the half-bridge drive circuit of an embodiment of the power adaptor;

FIG. 3*f* shows an example of a waveform for the high-side switch and the low-side switch of the half-bridge drive circuit of an embodiment of the power adaptor;

FIG. 4 shows a second embodiment of a power adaptor;

FIG. 5 is an example of a low-voltage process half bridge drive integrated circuit (IC) suitable for use in the circuit of FIG. 5 as IC1;

FIG. 6 shows a third embodiment of a power adaptor;

FIG. 7 is a circuit of a fourth embodiment of a power adaptor; and

Figure 8:
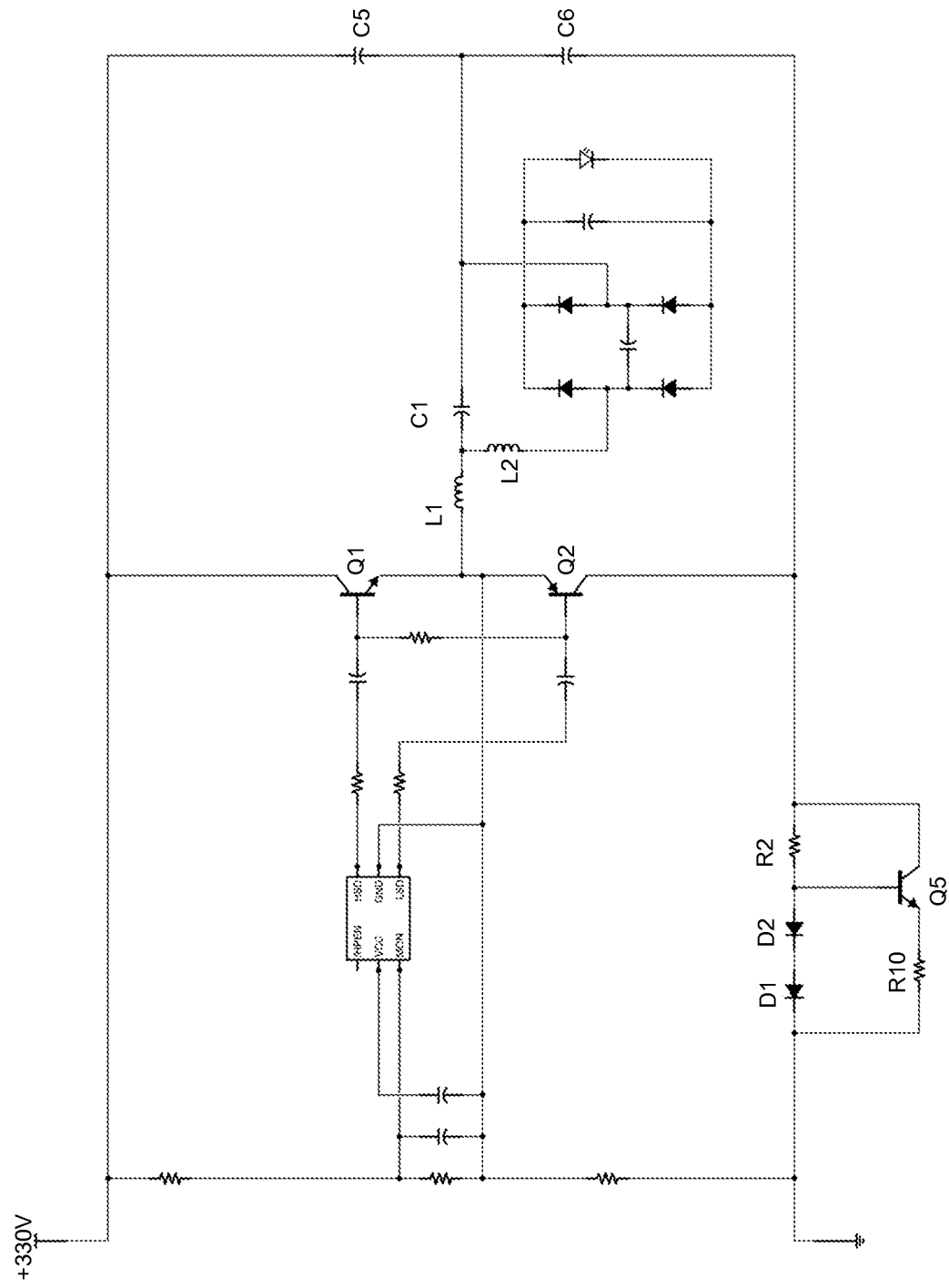

FIG. 8 is a circuit of a fifth embodiment of a power adaptor.

DETAILED DESCRIPTION

Figure 1:
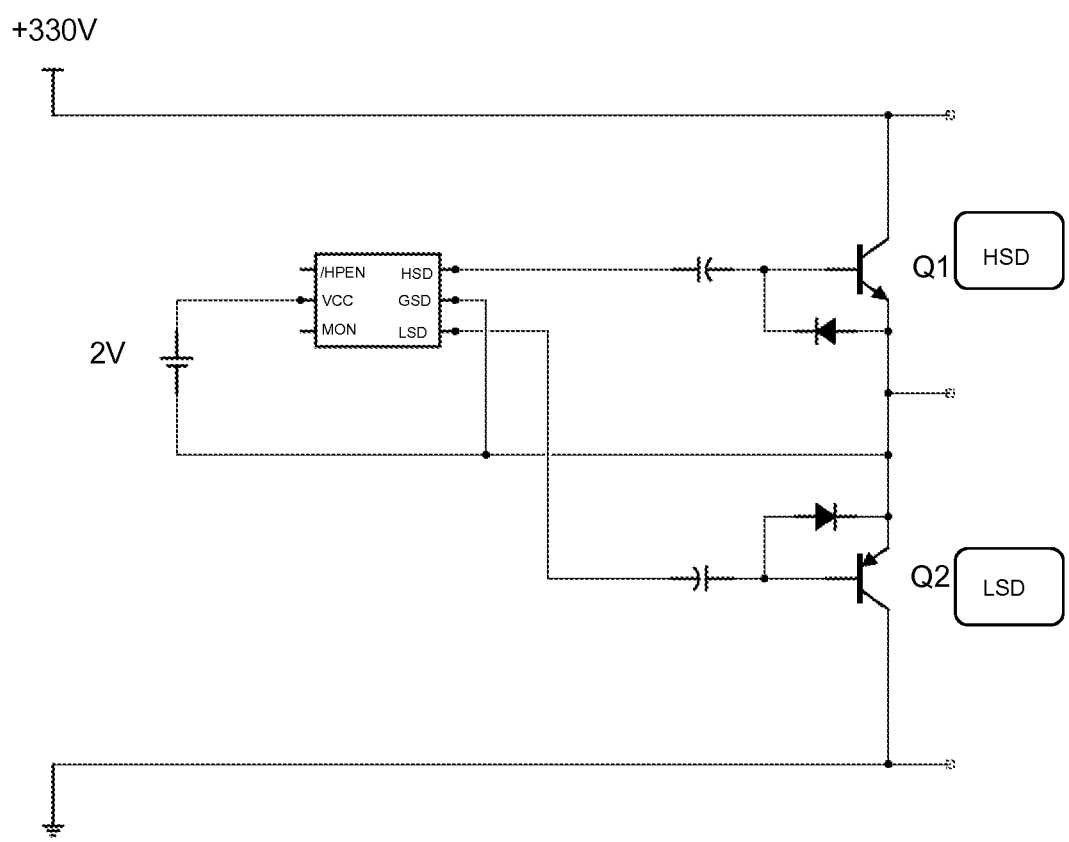
FIG. 1 shows a switch controller and a half-bridge drive circuit of a first embodiment of a power adaptor.
Figure 2:
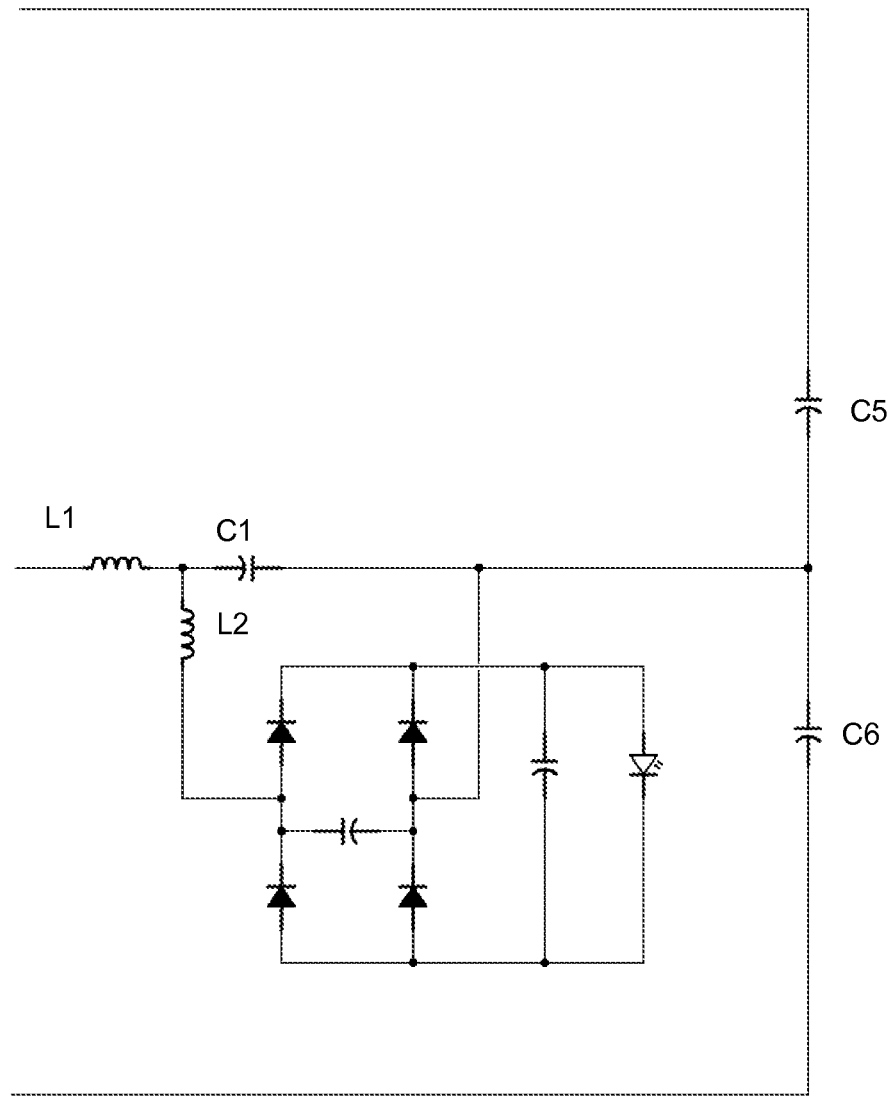
FIG. 2 shows an LCL series-parallel resonant circuit and DC link capacitors of the first embodiment of the power adaptor.

An embodiment of a power adaptor according to the invention comprises an input rectifier stage (not shown in the Figures), a switch controller (RAIS-DH) and a half bridge drive circuit (HSD,LSD) (shown in FIG. 1), and an LCL series-parallel resonant circuit (L1,C1,L2) and an output rectifier stage (shown in FIG. 2). The high-side switch, Q1, is an NPN BJT transistor, and the low-side switch, Q2, is PNP BJT transistor. Q1 and Q2 are arranged with their emitters/sources connected to a common point, which forms a floating ground for both Q1 and Q2. This common point also provides the output of the half-bridge drive circuit which, in this embodiment, is fed to an LCL series-parallel resonant circuit suitable for driving a solid state light source (of the form described in detail in GB 2449616 B8 and WO 2010/041067 A1).

Q1 and Q2 are each switched by providing a switching pulse to the respective base/gate, the voltage of the switching pulse being referenced to the emitter/source of the switch. When Q1 is switched on, the floating ground will be at the positive supply voltage, e.g., 330V, and the voltage at the base/gate of Q1 will be positive type relative to the floating ground and hence the emitter/source voltage. When Q2 is switched on, the floating ground will be at normal ground, e.g., 0V, and the voltage at the base/gate of Q1 will be negative relative to the floating ground and hence the emitter/source voltage.

The switches Q1 and Q2 are driven by a switch controller, which is an integrated circuit designated RAIS-DH, that is also referenced to the floating ground. Since the switch controller RAIS-DH is driving BJT transistors, which require +−0.7V, the switch controller can be powered at 2V. In order to switch on Q1, the switch controller provides a positive pulse to the base/gate of Q1, relative to the floating ground (at the positive supply voltage, e.g., 330V) and hence the emitter/source voltage. In order to switch on Q2, he switch controller provides a negative pulse to the base/gate of Q2, relative to the floating ground (at normal ground, e.g., 0V) and hence the emitter/source voltage.

Q1 forms the high-side drive (HSD) and Q2 forms the low-side drive (LSD) for an LCL series-parallel resonant circuit (shown in FIG. 2), which provides an output suitable for driving a solid state light source. The switch controller is configured to manipulate the current drawn at the input, the current delivered to the output, and/or the impedance of the power adaptor, by controlling the on-times of the high-side drive (HSD) and the low-side drive (LSD). This is described in detail above.

Examples of waveforms of the high-side drive (HSD) and the low-side drive (LSD) are shown in FIG. 3. FIG. 3*a* shows a conventional symmetric drive signal, with no overlapping, whereas FIGS. 3*b*-3*f* shown drive waveforms according to embodiments of the invention.

FIG. 3*b* shows the high-side drive (HSD) and the low-side drive (LSD) with on-times of different durations, i.e., asymmetric on-times. The degree of asymmetry between the high-side switch and the low-side switch determines the current drawn from the input. It has been found that the greater the degree of asymmetry between the on-times of the high-side switch and the low-side switch, the less current drawn from the input. Hence, the waveform of FIG. 3*b* will cause less current to be drawn at the input than the waveform of FIG. 3*a*. Furthermore, since there is no overlap between the on-times of the high-side drive (HSD) and the low-side drive (LSD), substantially the same current will be provided at the output.

FIG. 3*c* shows the high-side drive (HSD) and the low-side drive (LSD) with on-times of different durations, i.e., asymmetric on-times, which also have a period of overlap. This overlap between the on-times of the switches creates a load condition in the period of overlap, in each input cycle, which increases the current drawn at the input relative to the current delivered to the output in the period of overlap, in each input cycle. This enables a latch current for a dimmer switch to be drawn in each input cycle, in the period of overlap, and a lower hold current to be drawn subsequently, in each input cycle, without any need to change the frequency at which the resonant circuit is driven. Since the latch current for a conventional dimmer switch in a mains supply (e.g., 85 mA) typically only needs to be drawn for a few hundred μs, relative to the hold current (e.g., 50 mA) that is typically drawn for a few ms, the additional current (35 mA) that is not provided to the output would result in acceptably small losses, e.g., 100-200 mW on 230V mains supply. This control also helps reduce the voltage reduction problems seen just after the TRIAC of a conventional dimmer switch fires, and therefore negates the need for snubber circuits and their associated losses.

FIG. 3d shows the high-side drive (HSD) and the low-side drive (LSD) with the same period of overlap as the waveform of FIG. 3c, but with a significantly greater asymmetry between the on-times of the switches. Hence, the waveform of FIG. 3d will provide the same change between a higher latch current and a lower hold current, in each input cycle, but with less current being drawn at the input and correspondingly less current being provided to the output, across the whole input cycle, relative to the waveform of FIG. 3c, due to the greater asymmetry between the high-side drive (HSD) and the low-side drive (LSD).

FIGS. 3e and 3f each show the high-side drive (HSD) and the low-side drive (LSD) being provided with simultaneous on-times, which each provide a load condition to the input. However, the greater the duration of the overlap for the on-times or the duration of the simultaneous on-times, the lower the resistance or dynamic impedance of the load provided. Hence, the waveform of FIG. 3f provides a lower resistance or dynamic impedance than the waveform of FIG. 3e. This is particularly advantageous for solid state light sources, e.g., LEDs. In particular, this load condition may provide a DC path, which prevents false start-up conditions. This enables use with dimmers, and also prevents glowing occurring from a pickup supply.

The power adaptor according to embodiments of the invention is particularly advantageous in relation to the driving of solid state light sources from a mains supply including a conventional dimmer switch. In addition, however, the control discussed above may be used in other fields, for example in relation to motor control. In particular, embodiments of the present invention enable bi-directional motor control, for example, and driving DC and high frequency AC motors, for example.

A second embodiment of a power adaptor according to embodiments of the invention is shown in FIG. 4. The high-side switch, Q1, is an NPN transistor (or an n-channel FET), and the low-side switch, Q2, is PNP transistor (or a p-channel FET). Q1 and Q2 are arranged with their emitters/sources connected to a common point, which forms a floating ground for both Q1 and Q2. This common point also provides the output of the half-bridge drive circuit which, in this embodiment, is fed to an LCL series-parallel resonant circuit suitable for driving a solid state light source (of the form described in detail in GB 2449616 B8 and WO 2010/041067 A1).

Q1 and Q2 are each switched by providing a switching pulse to the respective base/gate, the voltage of the switching pulse being referenced to the emitter/source of the switch. When Q1 is switched on, the floating ground will be at the positive supply voltage, e.g., 330V, and the voltage at the base/gate of Q1 will be positive, 1-20V, +5V typical relative to the floating ground and hence the emitter/source voltage. When Q2 is switched on, the floating ground will be at normal ground, e.g., 0V, and the voltage at the base/gate of Q1 will be negative 1-20V, -5V typical relative to the floating ground and hence the emitter/source voltage.

The switches Q1 and Q2 are driven by an integrated circuit, IC1, which is also referenced to the floating ground. In order to switch on Q1, IC1 provides a +5V pulse to the base/gate of Q1, relative to the floating ground (at the positive supply voltage, e.g., 330V) and hence the emitter/source voltage. In order to switch on Q2, IC1 provides a -5V pulse to the base/gate of Q2, relative to the floating ground (at normal ground, e.g., 0V) and hence the emitter/source voltage.

The negative voltage switching pulse provided to the base/gate of Q2 is generated by a charge pump formed by C7, D1 and D2, which is driven by IC1. The charge-pump generates a -5V switching pulse when the input voltage from IC1 drops from 5V to 0V, and then returns to 5V. In particular, when the input voltage from IC1 drops from 5V to 0V, the voltage across C7 is held at 5V, which pulls the output of the charge pump to -5V. When the input voltage from IC1 returns to 5V, the output returns to 0V.

The floating ground will vary with the output of the half-bridge drive circuit, between the positive supply voltage, e.g., 330V, and normal ground, e.g., 0V. IC1 is initially powered by R1, C3 and R10. Once the output starts switching, it can utilize a bootstrap circuit (C4, R6, Z1 and D3) to provide a floating positive supply or a wattles capacitive supply fed via C10,C13. These capacitors can be those that would be present, in any event, across the switches.

It is also noted that where a bipolar junction transistor (BJT) is used, the PNP device may have a much slower turn-off time. The resistor R5 has therefore been added to provide a base extraction current to address this. If a slow NPN device is used, this technique may also be used for that device.

Relative to the prior art, embodiments of the invention remove the need for a level shifter, which is a high voltage circuit that is typically expensive and results in power loss, and hence reduced efficiency. Embodiments of the invention therefore reduce cost and increases efficiency relative to the prior art. In addition, embodiments of the invention enable the drive circuitry (IC1) to be at low voltage, and enables the same drive circuitry to drive both the high- and low-side switches.

FIG. 5 shows a simple integrated circuit implementation of the embodiment of FIG. 4.

FIG. 6 shows a further embodiment of the invention including a microprocessor, in which the ESD diodes on the ports of the microprocessor are utilized in the provision of a power supply for the microprocessor.

The circuit shown in FIG. 7 is a power adaptor comprising an input recitifier bridge, an LCL series parallel circuit (L1, L2m C1b and C11) driven by an integrated circuit U1 and transistors Q1 and Q2, and an output rectifier bridge. This type of power adaptor is described in WO 2008/120019, WO 2010/041067, WO 2010/139992, WO 2011/083336 and WO 2012/010900.

This configuration provides a power adaptor suitable for solid state light sources, such as LEDs, that has a constant current draw and high efficiency. In particular, the output current becomes independent of output voltage and if the power adaptor is powered by a low frequency sine voltage input, and the output voltage is constant, i.e., an LED load, the input current becomes a low frequency, substantially square wave ideal for drive by a TRIAC dimmer as it maintains the hold current at the lowest possible power whilst providing the LED with a current source that varies in brightness with the low frequency input voltage, i.e., it makes the LED act like a lamp bulb and enables control by a TRIAC dimmer at vastly reduced power and high power factor relative to other power adaptor technology.

The capacitance of the LCL series-parallel resonant circuit shown in FIG. 1 is provided by C1b and C11, which are connected in parallel. In addition, however, the circuit shown in FIG. 7 provides the possibility of switching C11 out of the circuit using thyristor Q4, which is controlled by integrated circuit U1 via level shifter Q3. Where C11 is switched out, the capacitance of the LCL series-parallel resonant circuit is significantly reduced to the capacitance of C1b only.

The power adaptor may therefore have a first mode where the capacitance of the LCL series-parallel resonant circuit is provided by C1b and C11, and a second mode where the capacitance of the LCL series-parallel resonant circuit is provided by C1b only and is therefore much lower. The first mode provides a higher current draw, and hence a higher power draw, relative to the second mode. The first mode may therefore be used to draw the latch current, and the dead band may then be varied to draw the (usually lower) hold current. For stable, low power lamps, however, the second mode may be utilized.

When entering the second mode by switching C11 out of the circuit, the integrated circuit U1 changes the drive frequency and dead band to that required for the modified resonant circuit to work. This allows for a much lower power for use by low power lamps, allowing the double hold principle to be used where the resonant circuit is used with mains supply, trailing edge and leading edge dimmers, where the lamp is stable. If instability is detected or it's preferred to switch modes on detection of the leading edge, the mode can be changed by switching C11 back into the circuit, thereby drawing significantly higher power and the required hold current.

The circuit shown in FIG. 7 may be modified to enable the capacitance of the LCL series-parallel resonant circuit to be switched out entirely, thereby leaving an LC resonant circuit. This may be achieved by removing C1b entirely, or enabling it to be switched out of the circuit by the integrated circuit U1. In this modified configuration, the LCL resonant circuit changes to an LC resonant circuit comprised of L1+L2 in series with C9. The integrated circuit U1 changes the drive frequency and dead band to that required for the LC resonant circuit to work. It has been found that the LC resonant circuit may be driven to provide the same properties as those of the LCL series-parallel resonant circuit discussed above, but only where the LED has a voltage comparable, e.g., at least +/−50%, or preferably +/−25%, to the rms voltage of the AC power supply.

For both of these alternatives, a dead band in the driving signal fed to the resonant circuit may be used to decrease the power to the LED and still draw the same current. The dead band may therefore be used to allow a lower amount of power to the LED, where the overall power is increased to allow the latch current to be drawn, which is often higher than the hold current. This removes the need for RC bleeder circuits.

Since the integrated circuit U1 is driving BJT transistors, which require +−0.7V, the integrated circuit can be 2V. The integrated circuit's power may therefore be extracted by three forward biased diodes D11B, D12A, D12B. The volt drop across these diodes is stored in C3 for the integrated circuit U1.

The gain of the transistors Q1 and Q2 may be used for fast start with high efficiency. In particular, R6 and R7 feeds the base of Q1 and Q2, which charges C3 at a rate set by R6 and R7 multiplied by the gain of the transistors Q1 and Q2. A few micro amperes loss in efficiency may therefore become a few milli amperes of charge for C3.

A further possible modification of the circuit shown in FIG. 7 is to reduce the inductance of L2 significantly, or even remove L2 entirely, thereby leaving an LC resonant circuit formed by L1 and C1b+C11. It has been found that the LC resonant circuit may be driven to provide the same properties as those of the LCL series-parallel resonant circuit discussed above, but only where the LED has a voltage comparable, e.g., at least +/−50%, or preferably +/−25%, to the rms voltage of the AC power supply.

The circuit shown in FIG. 8 is a power adaptor comprising an LCL series parallel circuit (L1, L2 and C1) driven by an integrated circuit IC1 and transistors Q1 and Q2, and an output rectifier bridge. This type of power adaptor is described in WO 2008/120019, WO 2010/041067, WO 2010/139992, WO 2011/083336 and WO 2012/010900.

This circuit also includes an active damping circuit for limiting the current when high inrush currents are active. The active damping circuit comprises a resistor (R2) for damping the current spike or current inrush associated with the firing of a TRIAC, together with a constant current circuit formed by Q5, R10, D1 and D2. When high inrush currents are active, the current is limited by R2 plus the constant current from the constant current circuit. When the circuit does not see high inrush, the constant current circuit feeds the LCL resonant circuit. The constant current circuit is adapted to feed the LCL resonant circuit at a current greater than that needed by the resonant circuit, such that the voltage drop across the constant current circuit is minimised.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A power adaptor comprising:
an input for connection to an AC power supply;
a resonant circuit coupled to the input that provides an output suitable for driving a load; at least one half-bridge drive circuit for providing a drive signal to the resonant circuit;
and
a switch controller for the at least one half-bridge drive circuit, the at least one half-bridge drive circuit having a high-side switch and a low-side switch each having an emitter or source terminal;
wherein the high-side switch and the low-side switch are arranged with their respective emitter or source terminals connected at a center of the at least one half bridge drive circuit, and the high-side switch and the low-side switch being configured with a switching voltage at a base or gate terminal that is determined relative to a voltage at the emitter or source terminal;
wherein the connection between the emitter or source terminals of the high-side switch and the low side switch provides a common reference for the switching voltage of the high-side switch and the low-side switch in a form of a floating ground;
wherein the switch controller is configured, to provide one or more of the following, in at least one mode: (i) to provide the high-side switch and the low-side switch with on-times of different durations, (ii) to provide the high-side switch and the low-side switch with on-times that overlap, and (iii) to provide the high-side switch and the low-side switch with on-times that are synchronous;

wherein the switch controller provides the high-side switch and the low-side switch with the on-times that overlap, which creates a load condition in a period of overlap, in each input cycle, and increases current drawn at the input relative to a current delivered to the output in the period of overlap, in each said input cycle.

2. The power adaptor as claimed in claim 1, wherein the high side switch and the low side switch are driven by drive circuitry, which includes at least an oscillator, and a ground connection of the drive circuitry is connected to the emitter or source terminals of the high-side switch and the low-side switch, such that the ground connection of the drive circuitry has the common reference to the high-side switch and the low side switch in the form of the floating ground.

3. The power adaptor as claimed in claim 1, wherein the switch controller is adapted to monitor a voltage of the AC power supply.

4. The power adaptor as claimed in claim 3, wherein the power adaptor is configured to monitor an input voltage, and alter a ratio between a current provided at the output and a resistance across the input, based on that input voltage.

5. The power adaptor as claimed in claim 4, wherein the ratio between the current provided at the output and the resistance across the input is altered proportionally based on the input voltage, such that sudden changes in current and/or the input resistance are not created when switching modes.

6. The power adaptor as claimed in claim 1, wherein the power adaptor is configured to switch between two or more modes, which each provide a different configuration of on-times for the high-side switch and the low-side switch.

7. The power adaptor as claimed in claim 6, wherein the resonant circuit is driven at, or approximately at, its resonant frequency or a sub-harmonic thereof in each of said two or more modes.

8. The power adaptor as claimed in claim 1, wherein the switch controller provides the high-side switch and the low-side switch with the on-times of different durations, such as an asymmetric on-times, such that a degree of asymmetry between the high-side switch and the low-side switch at least partially determines a current drawn at the input.

9. The power adaptor as claimed in claim 8, wherein the current drawn at the input is substantially equal to a current provided at the output.

10. The power adaptor as claimed in claim 1, wherein the switch controller is configured to vary a degree of asymmetry between the high-side switch and the low-side switch during each input cycle to determine a waveform of a current drawn from the input.

11. The power adaptor as claimed in claim 1, wherein the power adaptor is configured to drive a solid state light source, and is adapted to drive the resonant circuit at a first frequency to cause a latch current for a dimmer switch to be drawn in each said input cycle, in the period of overlap, and to drive the resonant circuit at a second frequency to cause a lower hold current to be drawn subsequently, in each said input cycle, with the first frequency and the second frequency being substantially the same.

12. The power adaptor as claimed in claim 1, wherein the power adaptor has a mode in which no power is provided at the output, but the power adaptor provides a load condition to the input, by the switch controller providing the high-side switch and the low-side switch with simultaneous on-times.

13. The power adaptor as claimed in claim 1, wherein the power adaptor has a mode in which a load condition is generated by overlapping or synchronous on-times of the high-side switch and the low-side switch, and the switch controller is configured to monitor a voltage of the AC power supply and determine whether an impedance of the load condition is acceptable for the voltage of the AC power supply.

14. The power adaptor as claimed in claim 1, wherein the high-side switch and the low-side switch are each bipolar junction transistors (BJTs).

15. The power adaptor as claimed in claim 1, wherein the resonant circuit is an LCL series-parallel resonant circuit.

16. The power adaptor as claimed in claim 1, wherein the power adaptor is configured to maintain a substantially constant current input for varying input voltages.

17. The power adaptor as claimed in claim 1, wherein the power adaptor is configured to draw a substantially sinusoidal current waveform from the mains supply by the switch controller providing the high-side switch and the low-side switch with on-times of different durations, such as asymmetric on-times, and varying the degree of asymmetry between the high-side switch and the low-side switch during each input cycle to provide a current drawn from the input with a substantially sinusoidal waveform.

18. The power adaptor as claimed in claim 1, wherein the high-side switch is an NPN bipolar junction transistor (BJT), and the low-side switch is a PNP bipolar junction transistor (BJT).

19. The power adaptor as claimed in claim 1, wherein the switch controller is an integrated circuit, and a ground connection of the switch controller is connected to the emitter or source terminals of the high-side switch and the low side switch, such that the ground connection of the switch controller has the common reference to the high-side switch and the low side switch in the form of the floating ground.

20. The power adaptor as claimed in claim 1, wherein the power adaptor is configured to drive solid state light sources from a mains supply including a conventional dimmer switch.

21. The power adaptor as claimed in claim 1, wherein the power adaptor is configured to drive a motor.

22. The power adaptor of claim 1, further comprising an active damping circuit for limiting current when high rush currents are active, the active damping circuit comprising a resistor for damping a current spike associated with a firing of a TRIAC.

23. A power adaptor comprising:
an input for connection to an AC power supply;
a resonant circuit coupled to the input that provides an output suitable to driving a load; at least one half-bridge drive circuit for providing a drive signal to the resonant circuit;
and
a switch controller for the at least one half-bridge drive circuit, the at least one half-bridge drive circuit having a high-side switch and a low-side switch each having an emitter or source terminal;
wherein the high-side switch and the low-side switch are arranged with their respective emitter or source terminals connected at a center of the at least one half bridge drive circuit, and the high side switch and the to side switch being configured with a switching voltage at a base or gate terminal that is determined relative to a voltage at the emitter or source terminal;

wherein the connection between the emitter or source terminals of the high side switch and the low side switch provides a common reference for the switching voltage of the high-side switch and the low-side switch in form of a floating ground; wherein the switch controller is adapted to monitor a voltage of the AC power supply;

wherein the power adaptor is configured to monitor ail input voltage, and alter a ratio between a current provided at the output and a resistance across the input, based on that input voltage;

wherein the switch controller is configured to provide one or more of the following, in at least one mode: (i) to provide the high-side switch and the low-side switch with on-times of different durations, (ii) to provide the high-side switch and the low-side switch with on-times that overlap, and (iii) to provide the high-side switch and the low-side switch with on-times that are synchronous;

wherein the switch controller provides the high-side switch and the low-side switch with the on-times that overlap, which creates a load condition in a period of overlap, in each moat cycle, and increase a current drawn at the input relative to a current delivered the output in the period of overlap, is each input cycle.

24. The power adaptor as claimed in claim 23, wherein the ratio between the current provided at the output and the resistance across the input is altered proportionally based on the input voltage, such that sudden changes in current and/or the input resistance are not created when switching modes.

* * * * *